(12) United States Patent  
Hage et al.

(10) Patent No.: US 8,860,658 B2
(45) Date of Patent: Oct. 14, 2014

(54) ELECTROPHORETIC DISPLAY UNIT AND METHOD FOR DRIVING AN ELECTROPHORETIC DISPLAY PANEL

(75) Inventors: Leendert Mark Hage, Eindhoven (NL); Bart Peeters, Lommel (BE); Cornelis Jan Hendrik de Zeeuw, Cuijk (NL); Erik van Veenendaal, Eindhoven (NL); Hjalmar Edzer Ayco Huitema, Veldoven (NL); Petrus Johannes Gerardus van Lieshout, Beek en Donk (NL); Johannes Cornelis Adriaan Hamers, Breugel (NL)

(73) Assignee: Creator Technology B.V., Breda (NL)

( * ) Notice: Subject to any disclaimer, the term of this patent is extended or adjusted under 35 U.S.C. 154(b) by 734 days.

(21) Appl. No.: 12/781,698

(22) Filed: May 17, 2010

(65) Prior Publication Data

US 2011/0279442 A1    Nov. 17, 2011

(51) Int. Cl.
*G09G 3/34* (2006.01)

(52) U.S. Cl.
USPC .......................................... 345/107

(58) Field of Classification Search
USPC .......................................... 345/107; 359/296
See application file for complete search history.

(56) References Cited

U.S. PATENT DOCUMENTS

| 2005/0099672 | A1* | 5/2005 | Jacobson et al. | 359/296 |
| 2007/0052665 | A1 | 3/2007 | Zhou et al. | |
| 2007/0075962 | A1* | 4/2007 | Zhou et al. | 345/107 |

FOREIGN PATENT DOCUMENTS

| WO | WO 2004/001497 A1 | 12/2003 |
| WO | WO 2004/104977 A1 | 12/2004 |
| WO | WO 2005/027088 A1 | 3/2005 |

\* cited by examiner

*Primary Examiner* — Dennis Joseph

(57) ABSTRACT

An electrophoretic display unit is presented that comprises an electrophoretic display panel (1). A medium (5) having embedded therein a plurality of electrophoretic display elements (7) is controlled by a first and a second pixel electrode (22b, 6). In addition a sensor constructed to generate a signal ($S_T$) indicative for a temperature of the display panel and a driver (15) for driving the display panel (1) is provided. The sensor (250) includes a resistance sensor constructed to detect a resistance of the medium (5) between a first (22c) and a second sensor electrode (6), and the driver is controllable according to the resistance detected by the resistance sensor.

5 Claims, 8 Drawing Sheets

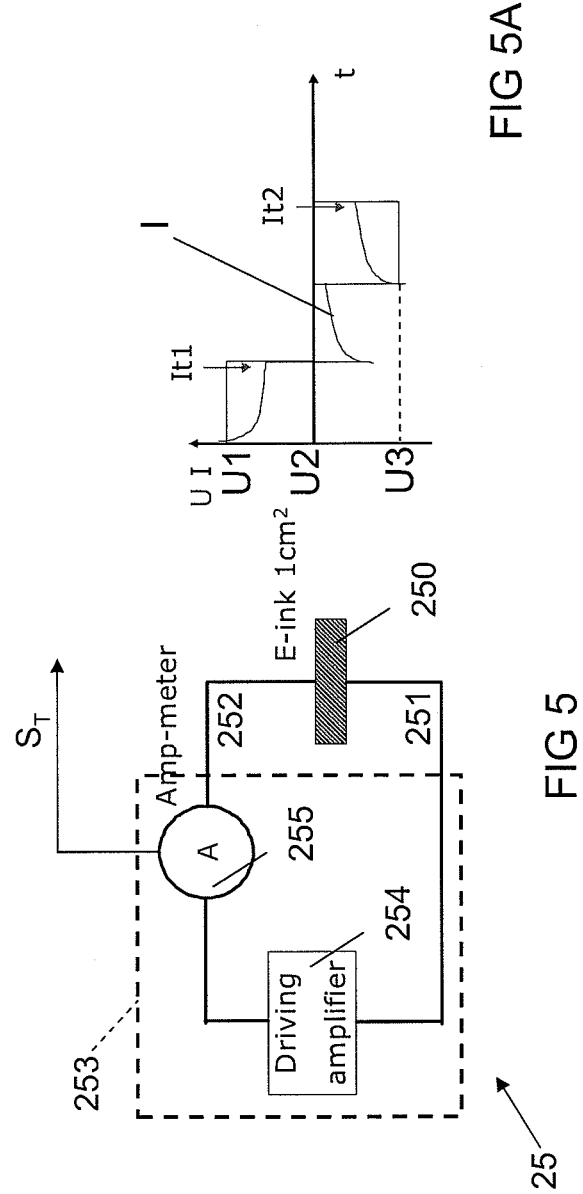

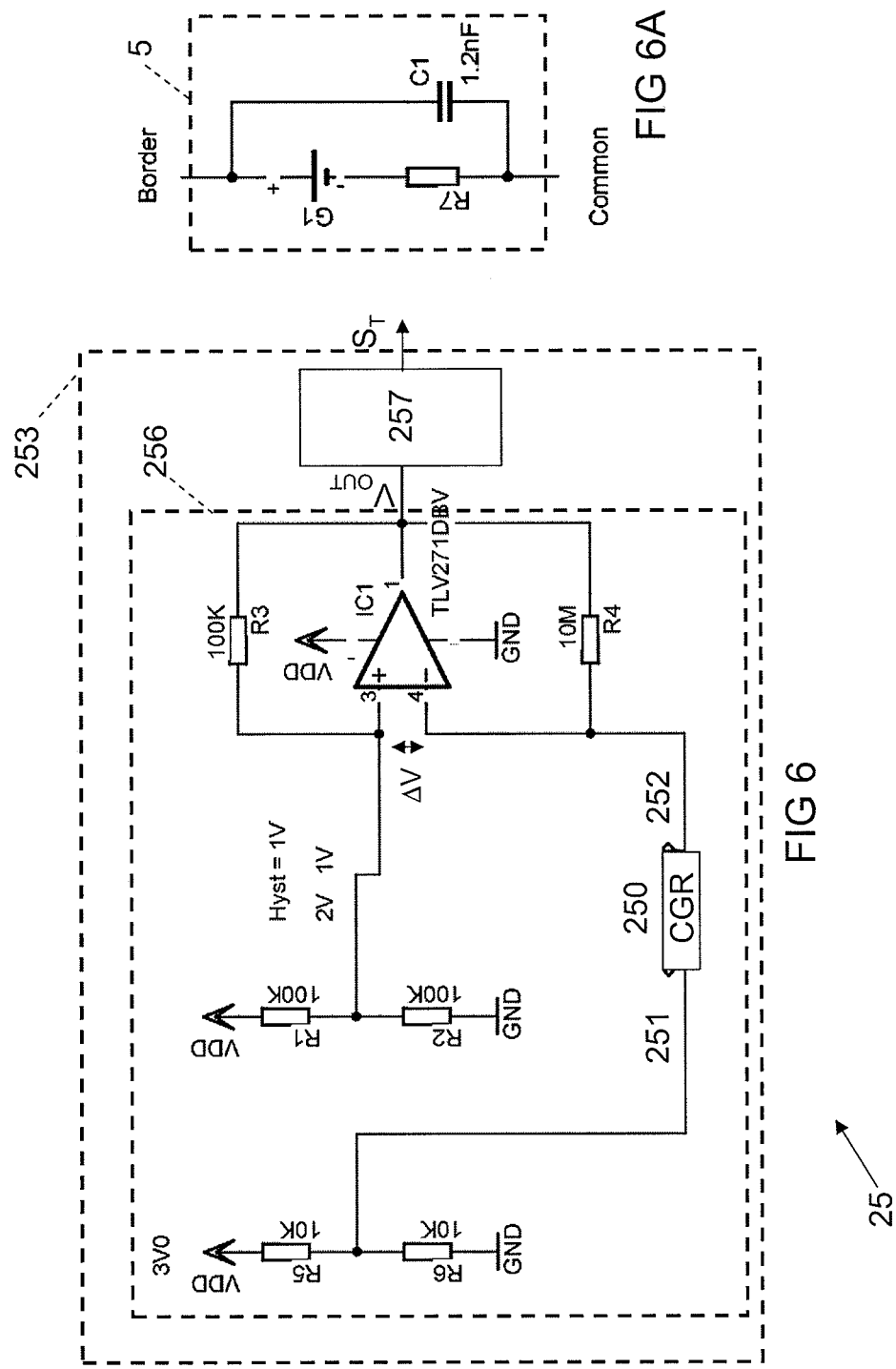

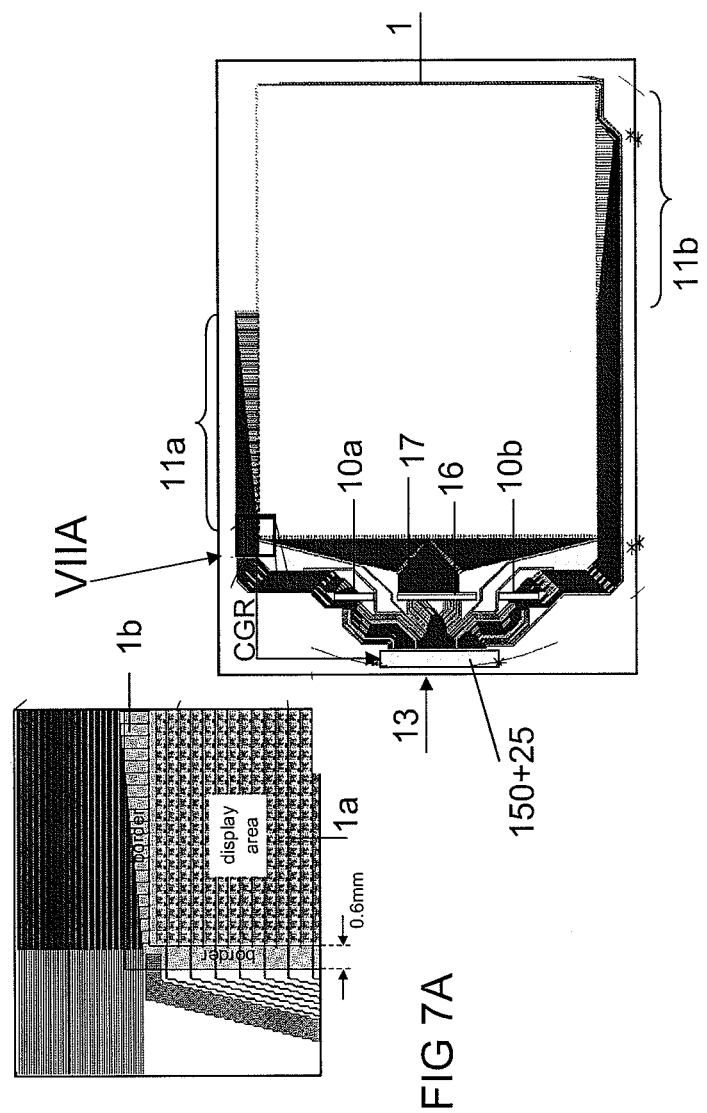

ELECTROPHORETIC DISPLAY UNIT AND METHOD FOR DRIVING AN ELECTROPHORETIC DISPLAY PANEL

FIELD OF THE INVENTION

The present invention relates to electrophoretic display units, and to methods of driving an electrophoretic display panel.

BACKGROUND

An electrophoretic display panel is known that comprises a plurality of electrophoretic display elements arranged between a first electrode layer and second electrode layer. The display elements are capsules with a dispersion of electrically charged black and white or colored nano-particles in a clear solution. The display panel may be manufactured by depositing an emulsion of these capsules in an appropriate binder as a dense monolayer onto an organic substrate with an electrode of an electrically conductive, transparent material, such as indium tin oxide (ITO). After that, the binder is cured to make the system mechanically robust. The electrophoretic medium so obtained is laminated by a thin adhesive layer onto a backplane, thereby sandwiching the capsules, binder and adhesive between the ITO electrode and the backplane electrodes (e.g. pixel pads of an active-matrix display). The black and white particles are moved within the capsules by applying an electric field between the ITO and backplane electrode, thereby enabling rendering of grey levels.

The behavior of the display panel is influenced by its temperature in several ways. The viscosity of the capsule fluid, and therewith the mobility of the nano-particles, is dependent on the temperature. In addition, if the display elements are arranged as an active matrix, the behavior of the transistor elements of the active matrix is dependent on temperature. Last but not least, the electric behavior (mainly resistance, further denoted herein as cell gap resistance or briefly CGR) of the binder, capsule walls and adhesive layer will change dramatically with changing temperature. Generally these effects will cause the switching speed to increase with increasing temperature. Care has to be taken however that the decreasing resistance between the ITO and the backplane electrode does not cause the switching behavior to degenerate. This will cause sub-optimal driving and thereby visible artifacts such as ghosting, image sticking or deviations in grey scale rendering. In particular a rollable display in its rolled out state adapts very fast to the temperature in the environment as it is extremely thin and lightweight.

Accordingly it is necessary to drive the display elements of the display panel with a temperature dependent driving scheme to achieve an optimal switching behavior across the complete operational temperature range.

US2007/0052665 A1 describes an electrophoretic display unit that is provided with an embedded temperature sensor embedded in the display panel, typically a silicon based sensor. The sensor or other temperature sensing device equipped with a transducer transmits a digital control signal to a processor. The processor uses this digital control signal to drive the display elements with a progressive number of pre-pulses at higher temperatures.

SUMMARY OF THE INVENTION

It is a general purpose of the present invention to provide an improved electrophoretic display unit. It is a further purpose of the invention to provide an improved method for driving an electrophoretic display panel.

According to a first aspect of the present invention an electrophoretic display unit is provided that includes:

an electrophoretic display panel comprising a medium having embedded therein a plurality of electrophoretic display elements controlled by a first and a second pixel electrode, a sensor constructed to generate a signal dependent on a temperature of the display panel, a driver for driving the display panel, wherein the sensor includes a resistance sensor constructed to detect a resistance of the medium between a first and a second sensor electrode, and the driver is controllable according to the resistance detected by the resistance sensor.

As described above, the cell gap resistance of the medium varies as a function of temperature. In the display unit according to the present invention this effect is used to compensate the behavior of the display panel for temperature changes. By measuring the resistance of the medium, the temperature or the value for a suitable control signal can be determined using a formula or look-up table. Because cell gap resistance is the most important factor influencing the driving characteristics of the display, measuring this parameter is the most direct way to determine a driving scheme that compensates for this effect.

Characteristics of the driver may further be controlled by other signals, for example, the type of content, application, image (meta) data etc.

In a practical arrangement the medium is sandwiched between a first and a second electrode layer. The sensor electrodes may be formed as separate elements arranged in the medium between the first and the second electrode layer. However, in an embodiment the first and the second sensor electrode are formed by the first and the second electrode layer respectively. This is advantageous in that the sensor electrodes can be manufactured with the display electrodes in the same processing steps.

An electrode may be used as a sensor electrode and as a pixel electrode on a time-multiplexed basis. Alternatively an electrode may simultaneously serve as a pixel electrode and as a sensor electrode by superposing a measurement signal for measuring the cell gap resistance onto the drive signal for controlling one or more display elements. In an embodiment at least one of the sensor electrodes is a separate portion within one of the electrode layers. This simplifies the control of the display elements and the measurement of the cell gap resistance. The other sensor electrode may be integral with the other of the electrode layers.

In an embodiment the first and the second electrode layer may each comprise a plurality of electrode lines, wherein the electrode lines of the first electrode layer are arranged transverse to the electrode lines of the second electrode layer.

In another embodiment the display elements are driven segment-wise by a plurality of segment electrodes, each controlling a respective segment with one or more display elements. Each segment electrode may have a corresponding counter electrode. Alternatively the segment electrodes may have a common counter electrode. The segment electrodes may be each controlled by a respective drive element, for example a switching element, such as a transistor.

In an embodiment the first electrode layer comprises individual electrode portions, wherein one of said electrode portions forms the first sensor electrode of the at least one sensor and the second electrode layer comprises a common electrode that also forms the second sensor electrode of the at least one sensor. This arrangement is favorable for use in an active-matrix display. The resistance measured in this embodiment is substantially the resistance of the medium atop the first sensor electrode.

The electrophoretic display unit may have a plurality of sensors, wherein each sensor has a resistance sensor with a respective electrode portion in the first electrode layer.

One or more individual electrode portions of the first electrode layer may serve both as first sensor electrodes and as display electrodes. Such individual electrode portions may be alternatively switched to measure a resistance of the medium in their neighborhood and as a display electrode to control the electrophoretic display elements. In an embodiment one or more individual electrode portions in the first electrode layer are dedicated as sensor electrodes. In this way interference between the display function and the sensor function is avoided. For example, the electrophoretic display panel may have a central display area with individual electrode portions controlled by a matrix of transistor elements and one or more electrode portions added around the display area to measure a resistance of the medium between said electrode portions and the opposing common electrode.

The sensors corresponding to each of the sensor electrodes may each generate a respective temperature dependent signal (temperature signal). The set of temperature signals generated in this way may be used to generate an overall temperature signal that is representative for an average temperature of the display panel. Alternatively the temperature signals may be used to control the driving scheme of respective sections in the central area of the display panel. Two or more temperature signals may be interpolated to generate an interpolated temperature signal that is representative for a temperature at a specific location at the central area.

In an embodiment the sensor is part of a sensor unit that further comprises a drive module that provides a predetermined electric signal to the sensor electrodes and a measurement module that measures a parameter of said electric signal depending on the resistive value of the resistance. The predetermined signal is for example a square wave signal having an amplitude of a predetermined voltage. The predetermined signal may also be a DC signal. The measurement module may measure the current flowing through the resistance. Alternatively the predetermined electrical signal may be a current with a predetermined amplitude. In that case the measurement module may measure the voltage over the resistance. The frequency of the predetermined electric signal is preferably in a range of 10 Hz to 1 MHz. If the frequency is significantly lower than 10 Hz, e.g. 5 Hz, the display elements involved in the measurement will show a visual effect. If the frequency is significantly higher than 1 MHz, e.g. 10 MHz, then the accuracy of the measurement may be relatively low.

In an embodiment the sensor is part of a sensor unit that further comprises an oscillator circuit that generates an electric signal with a frequency dependent on a resistive value of the resistance between the sensor electrodes. In this embodiment the output signal representing the cell-gap resistance does not need an A/D-converter to be acquired by a fully digital controller. Pulse-width and frequency are very well suited to be measured by fully digital circuitry. By means of a look-up table, these values can be mapped to generate values of a signal for effectively compensating temperature dependent behavior of the display panel. Also in this case the frequency of the predetermined electric signal is preferably in a range of 10 Hz to 1 MHz. Although the frequency is dependent on the temperature, the oscillator circuit may be designed such that within normal temperature ranges the frequency remains within the above-mentioned boundaries of 10 Hz and 1 MHz.

In an alternative embodiment a portion of the display panel that comprises the resistance sensor may be provided with a non-transparent layer, so that fluctuations of the state of the display elements due to the measurement are not visible also at lower frequencies.

In yet another alternative embodiment the medium may be free of display elements near the sensor electrodes. However, in the latter case for the temperature compensation scheme it has to be taken into account that the resistance of the medium measured in front of said sensor electrodes differs from the resistance of the medium in the display area.

In yet another embodiment the sensor electrodes are both located in the display panel, with the display medium in front of the sensor electrodes, and the resistance measured by the sensor is not the cell gap resistance but a lateral resistance. This lateral resistance that is measured has a one-to-one relation to the cell gap resistance.

According to a second aspect of the invention a method is provided for driving an electrophoretic display panel comprising the steps of detecting a resistance of the medium between a first and a second sensor electrode, driving the electrophoretic display panel via the first and the second electrode layer according to the detected resistance of the medium between the first and the second sensor electrode.

Various options are possible to change the driver characteristics to compensate for temperature dependencies of the display panel to achieve that the behavior of the display unit as a whole becomes more independent of temperature.

An option is to increase the amplitude of the drive signal for driving the display elements to compensate a tendency of the display panel to react more slowly at lower temperatures. Another option is to increase the width of drive signal pulses for driving the display elements to compensate a tendency of the display panel to react more slowly at lower temperatures. Yet another option is to add a number of pre-pulses with a progressively shorter duration at higher temperatures to the drive signal for driving the display elements, as is described in the above-mentioned prior art US2007/0052665.

BRIEF DESCRIPTION OF THE DRAWINGS

These and other aspects are described in more detail with reference to the drawings wherein:

FIG. 5 shows the sensor unit in a first embodiment of the display unit, FIG. 5A shows electric signals occurring in the sensor unit of FIG. 5, FIG. 6 shows the sensor unit in a second embodiment of the display unit, FIG. 6A shows an electric model of a part of the display unit, FIG. 7 shows a geometrical arrangement of various parts in a practical embodiment of the display unit, FIG. 7A shows a detail according to VIIA in FIG. 7.

DETAILED DESCRIPTION OF EMBODIMENTS

In the following detailed description numerous specific details are set forth in order to provide a thorough understanding of the present invention. However, it will be understood by one skilled in the art that the present invention may be practiced without these specific details. In other instances, well known methods, procedures, and components have not been described in detail so as not to obscure aspects of the present invention.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes and sizes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It will be understood that when an element or layer is referred to as being "coupled to" another element or layer, it can be directly on, connected or coupled to the other element or layer or intervening elements or layers may be present. In contrast, when an element is referred to as being "connected to" another element or layer, there are no intervening elements or layers present. Like numbers refer to like elements throughout. As used herein, the term "and/or" includes any and all combinations of one or more of the associated listed items.

Figure 1:
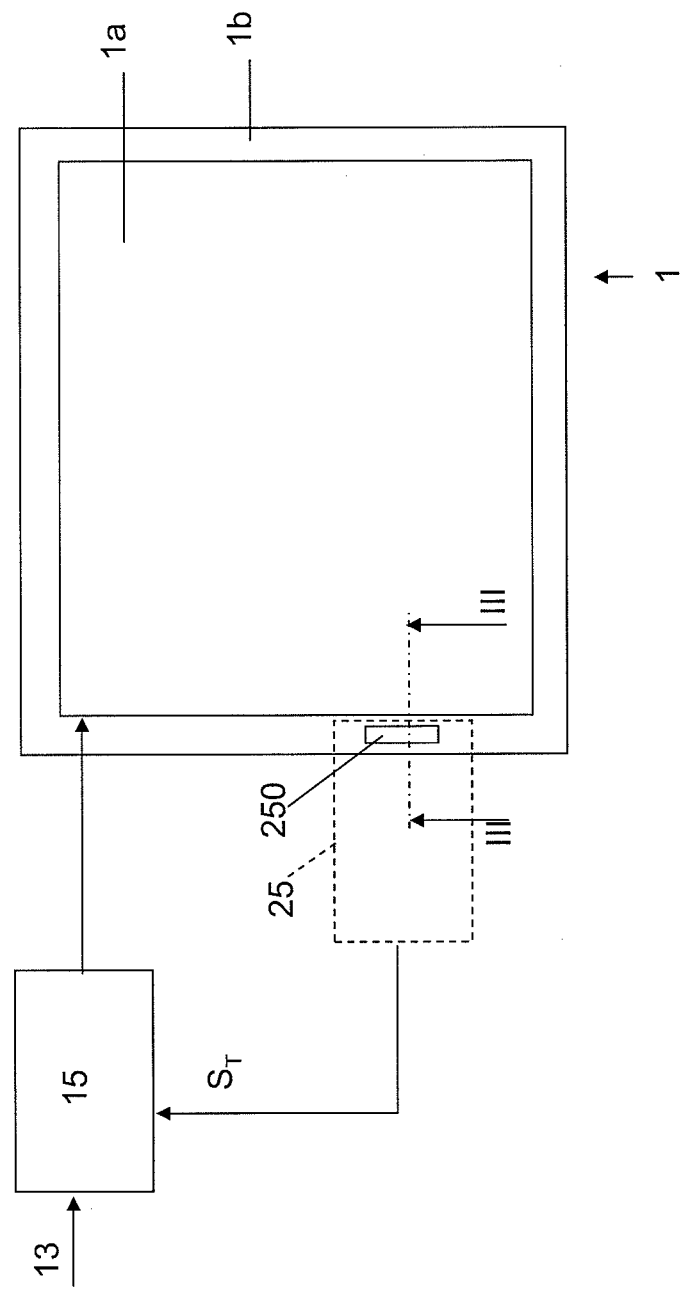
FIG. 1 schematically shows an electrophoretic display unit having a display panel.

FIG. 1 schematically shows an electrophoretic display unit that comprises an electrophoretic display panel 1, a driver 15 for driving the display panel 1 and a sensor unit 25.

Figure 2:
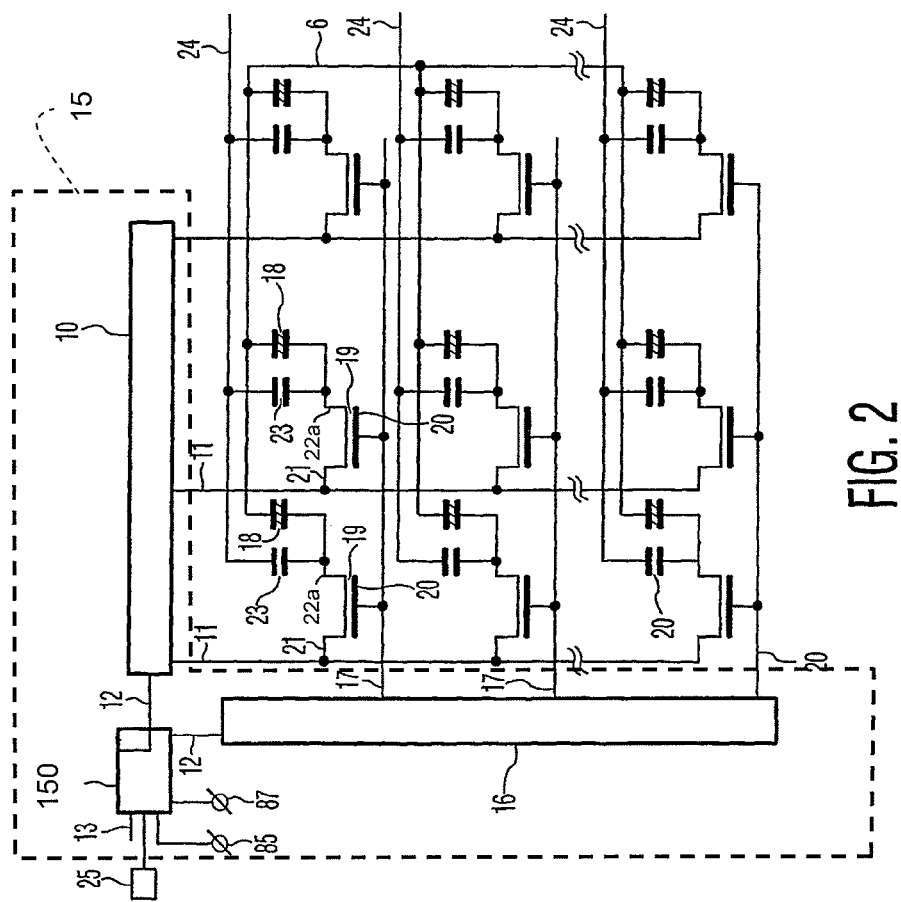
FIG. 2 is an equivalent circuit diagram of a portion of the display panel.
Figure 3:
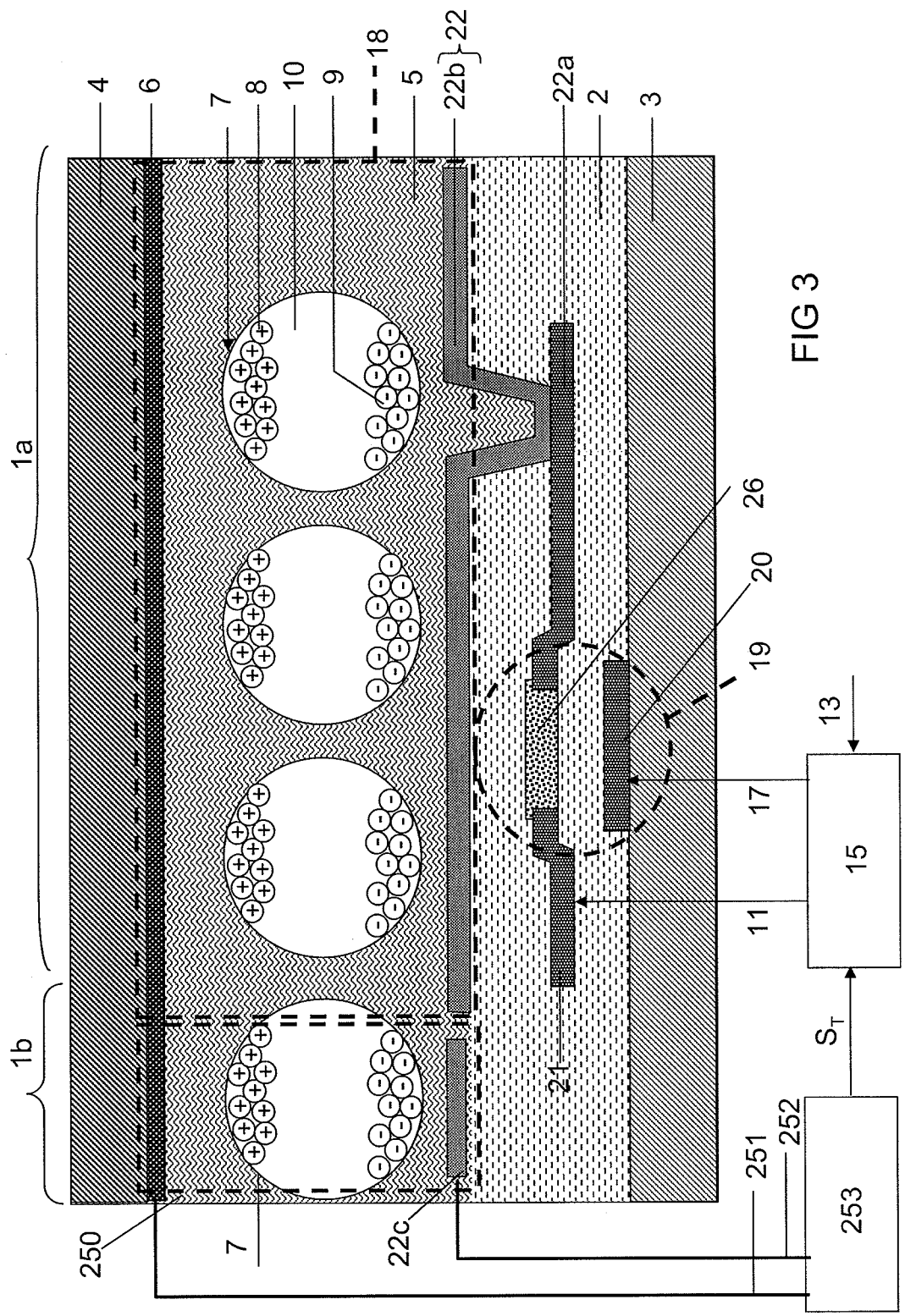
FIG. 3 is a cross-section according to III-III in FIG. 1.

In particular the display panel 1 is an active matrix display. FIG. 2 is an equivalent circuit diagram of a portion of the display panel 1, and FIG. 3 shows a cross-section according to III-III in FIG. 1. As shown in FIG. 3 the display panel 1 comprises an electrophoretic medium 5 having embedded electrophoretic display elements 7 between electrode 6 on top substrate 4 and electrode 22 on substrate 3 provided with active switching elements 19. For clarity FIG. 3 only shows a single switching element 19 and associated pixel 18. In practice however the display panel 1 may have a plurality of switching elements arranged in a matrix comprising several hundreds to several thousands of rows and several hundreds to several thousands of columns. The active switching element 19 is a thin film transistor with gate electrode 20, semiconducting channel 26, source electrode 21 and drain electrode 22a that is electrically coupled to the pixel electrode 22b of the associated pixel 18. The pixel 18 controlled by the active switching element 19 comprises a set of display elements in the form of microcapsules 7 embedded in the medium 5. Preferably, a counter electrode 6 is provided on the film comprising the encapsulated electrophoretic ink, but a counter electrode could be alternatively provided too on the base substrate in the case of operation with in-plane electric fields.

The set of display elements 7 may comprise one or more display elements. The electrophoretic medium with the embedded electrophoretic display elements 7 is arranged between a first electrode layer 22 and a second electrode layer 6. At least one of the electrode layers 6, 22, here the first electrode layer 22 has a plurality of mutually separate electrode portions 22b, 22c. The display elements 7 are formed by microcapsules that comprise a dispersion of positively charged white nano-particles 8 and negatively charged black nano-particles 9 in a clear solution 10.

The medium 5 is preferably a transparent polymeric material that may be cured (i.e., cross-linked from a low-viscosity state into extremely high viscosity) or otherwise solidified at relatively low temperatures, and which readily accepts, in its low-viscosity state, a dispersion of microcapsules. Useful materials include polyvinyl alcohols, gelatins, epoxies and other resins.

As shown in FIG. 2, the driver 15 for driving the active switching elements 19 comprises a row driver 16 and a column driver 10 and a processor 150 that controls the row and column driver 16, 10. The display panel 1 comprises a matrix of display elements at the area of crossings of row or selection electrodes 17 and column or data electrodes 11. The row driver 16 consecutively selects the row electrodes 17, while a column driver 10 provides a data signal to the column electrodes 11. The processor 150 first processes incoming data 13, including input from the sensor unit 25 into the data signals, in particular, the (pre)pulses and (pre)pulse sequence of the present invention. Counter electrodes may be coupled to two outputs 85, 87 of the processor 150. Mutual synchronization between the column driver 10 and the row driver 16 takes place via drive lines 12. Select signals from the row driver 16 select the pixel electrodes 22b via drain 22a of the thin-film transistors 19 whose gate electrodes 20 are electrically connected to the row electrodes 17 and the source electrodes 21 are electrically connected to the column electrodes 11. A data signal present at the column electrode 11 is transferred to the pixel electrode 22b of the display element coupled to the drain electrode 22a via the TFT. In the embodiment shown, the display device of FIG. 1 also comprises an additional capacitor 23 at the location of each display element 18. In this embodiment, the additional capacitor 23 is connected to one or more storage capacitor lines 24. Instead of TFT's, other switching elements can be used, such as diodes, MIM's, etc.

As shown in FIGS. 1 and 3, the sensor unit 25 has a resistance sensor 250 that is embedded in the display panel 1. The sensor unit 25 generates a dependent signal, in the sequel also denoted as temperature signal $S_T$ that is indicative for a temperature of the display panel 1. The at least one sensor unit 25 generates the temperature signal $S_T$ dependent on the resistance of the medium 5 between a first sensor electrode 22c and a second sensor electrode 6. The first sensor electrode 22c, the second sensor electrode 6 and the medium 5 between the first and the second sensor electrode 22c, 6 forms the resistance sensor 250. The resistance measured between the first and the second sensor electrode 22c, 6 is substantially the resistance of the portion of the medium 5 that is present atop the first sensor electrode 6.

The resistance sensor 250 is coupled via signal lines 251, 252 to signal generation unit 253 that generates the temperature signal $S_T$.

The driver 15 for driving the display panel 1 has a characteristic that is controlled by the temperature signal $S_T$ of the at least one sensor unit 25.

As can be seen in FIG. 3, the first sensor electrode 22c and the second sensor electrode 6 are formed by the first electrode layer 22 and the second electrode layer 6 respectively. The first electrode layer 22 comprises individual electrode portions 22b, 22c. One of the electrode portions forms the first sensor electrode 22c of the at least one sensor unit 25. The second electrode layer 6 comprises a common electrode that also forms the second sensor electrode 6 of the at least one sensor unit 25. The second electrode layer 6 also functions as a common electrode for the display elements 7.

In the embodiment shown in FIGS. 1, 2 and 3, the individual electrode portion 22c in the first electrode layer 22 is dedicated as a sensor electrode. It has no function for display purposes.

In the embodiment shown the electrophoretic display panel 1 has a central display area 1a with individual electrode portions 22b forming pixel electrodes. The pixel electrodes 22b are controlled by a matrix of transistor elements 19 via a respective drain 22a thereof. The display panel 1 further has one or more electrode portions 22c in an area 1b outside the display area 1a to measure a resistance of the medium 5 between said sensor electrode formed by portion 22c and the opposing common electrode 6. In the embodiment shown the area 1b is a border around the display area 1a. The measurements may be carried out during periodically recurring time intervals. Outside this time intervals a control voltage may be applied at the sensor electrodes 22c, 6 to achieve that the border assumes a predetermined gray-value or color for decorative purposes. The electrode portion 22c may cover the entire border 1b, so that the resistance measured is the average value of the resistance of the medium 5 present in the medium between the substrates 3 and 4 in the border region. Alternatively the border 1b may comprise a plurality of mutually separate electrode portions of respective mutually independent resistance sensors. In that case a temperature may be estimated for each of various regions of the display panel.

Figure 4:
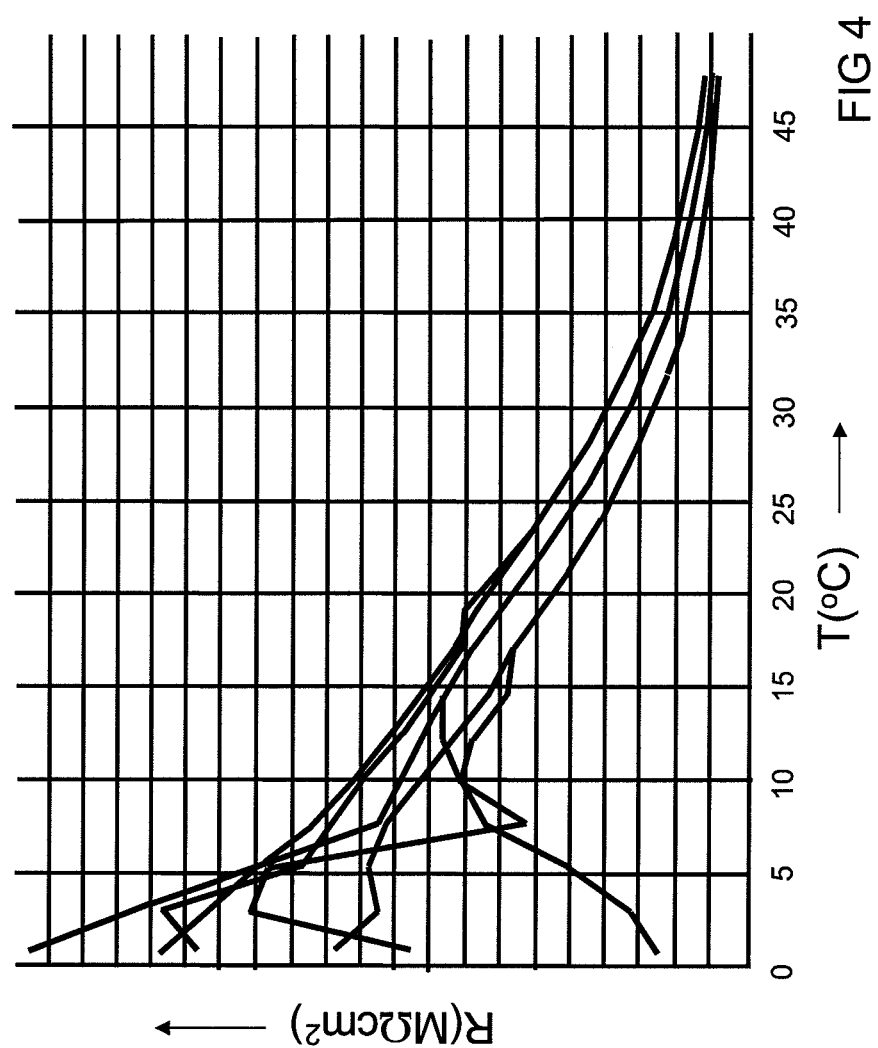
FIG. 4 shows a relation measured between a resistance of an electrophoretic medium and a temperature thereof.

FIG. 4 shows the relation between cell gap resistance R in MΩcm² and temperature T in 0° C. as measured for various species of a regular E Ink Vizplex™ laminate.

Therein the cell gap resistance is in the order of 50M☐cm² at room temperature. It varies between 5M☐cm² at high temperatures (50° C.) to >100M☐cm² at low temperatures (0° C.). For a display with a 5" diagonal and a border width of 0.6 mm, the total area of the border electrode is about 2 cm², necessitating a resistance measurement with a range of 1 . . . 100M☐. The temperature T was varied between 0 and 50 degrees. In a range of 10 to 50 degrees the resistance of the medium is a good indicator of the temperature. The variation of the cell gap resistance (CGR) within a batch is smaller than ±5%, and within a batch the shape of the temperature dependence is identical for all samples. Accordingly a lookup table (LUT) for determining the temperature as a function of the cell gap resistance may be based on measurements for a single sample.

The dependence of the cell gap resistance on the temperature is in practice the most important cause for the temperature behavior of the display panel. Due to its high sensitivity it is also a very good indicator for the environment temperature. Also for this reason the cell gap resistance itself instead of the temperature can be monitored and used as the parameter that indicates the expected behavior of the display panel.

Various options are possible to measure the cell gap resistance of the medium.

FIG. 5 shows a signal generation unit 253 in a first embodiment of the display unit. Therein the signal generation unit 253 comprises a drive module 254 that provides a predetermined electric signal to the sensor electrodes of the sensor 250 and a measurement module 255 that measures a parameter of said electric signal depending on the resistive value of the resistance. For example a signal is applied having a voltage that periodically alternates between U1, U2, U3 (as shown in FIG. 5A) and the current I through the sensor 250 with the cell gap resistance is measured after steady state is attained to exclude capacitive effects. Alternatively the current may be varied according to a predetermined pattern by a current source and the resulting voltage over the cell gap resistance may be measured.

In another embodiment, shown in FIG. 6, the signal generation circuit 253 of the at least one sensor unit 25 comprises an oscillator circuit 256 that includes the resistance sensor 250 and that generates an electric signal $V_{OUT}$ with a frequency dependent on a resistive value of the resistance sensor 250. In the example of FIG. 6 the oscillator circuit 256 comprises an op-amp IC1, e.g. of type TLV271 DBV having an output 1, a non-inverting input 3 and an inverting input 4. The non-inverting input 3 is coupled to a central node of a first voltage divider that comprises a first and a second resistor R1, R2 each of 100 kΩ and that is connected at one end to ground (GND) and at the other end to VDD, here having a value of 3V. The oscillator circuit 256 comprises a second voltage divider R5, R6 having a first and a second resistor R5, R6, each of 10 kΩ. The inverting input 4 of the op-amp IC1 is coupled to the central node of the second voltage divider R5, R6 via the resistance sensor 250. The non-inverting input 3 of the op-amp IC1 is further coupled to the output 1 via a feedback resistor R3 of 100 kΩ. The inverting input 4 of the op-amp IC1 is further coupled to the output 1 via a feedback resistor R4 of 10MΩ.

FIG. 6A shows a model of the electric behavior of the medium 5 including the electrophoretic display elements. The electric behavior is modelled as a capacitive element C1 in parallel to a series arrangement of a resistive element R7 and a voltage source G1. The voltage source G1 models the charge accumulation behavior of the medium 5.

Figure 6C:
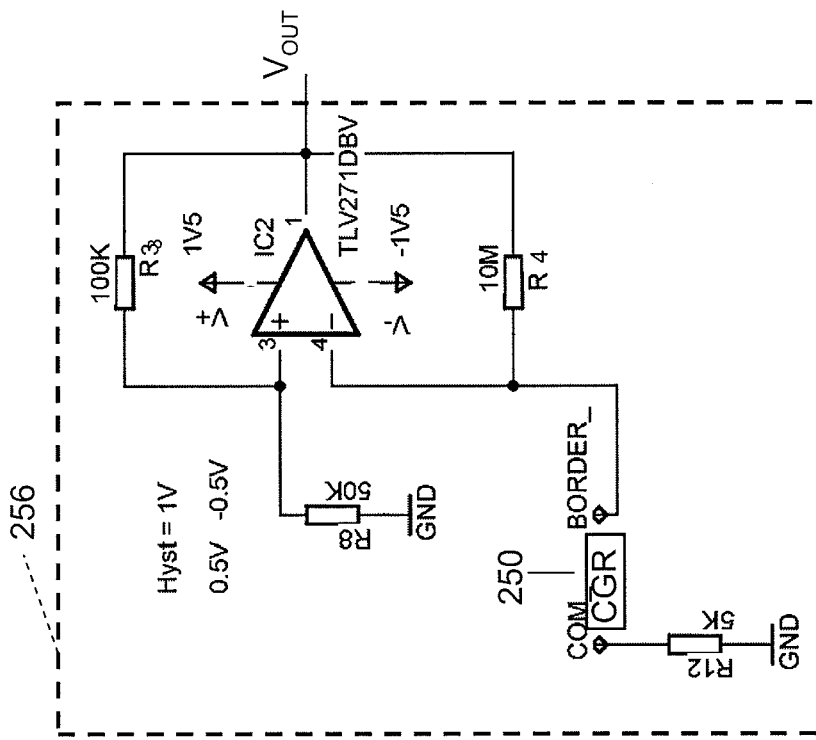
FIG. 6C shows an alternative sensor unit in the second embodiment of the display unit.
Figure 6B:
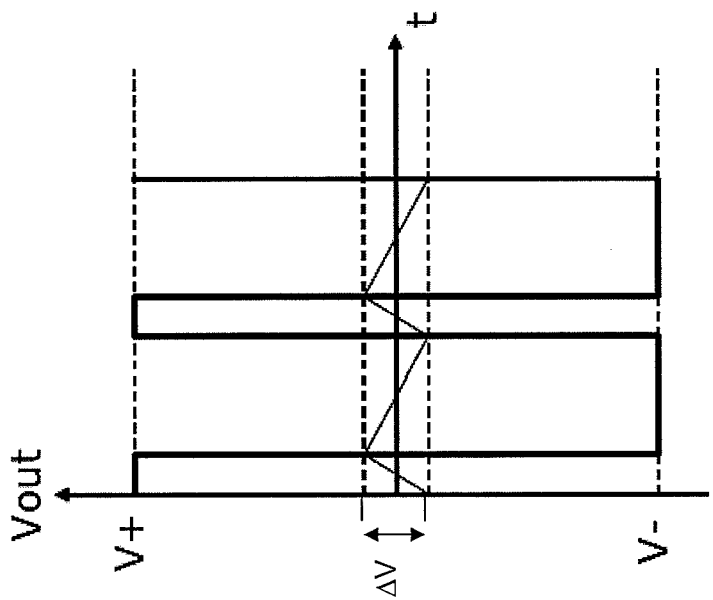
FIG. 6B shows electric signals occurring in the sensor unit of FIG. 6.

FIG. 6B shows electric signals occurring in the oscillator circuit 256 of FIG. 6. The inner curve shows the voltage ΔV over the input terminals of the operational amplifier IC1, and the outer curve shows the temperature signal $V_{OUT}$ at the output of the oscillator circuit 256. Due to the high amplification of the operational amplifier IC1, the output signal $V_{OUT}$ saturates to a rectangular wave. The output signal $V_{OUT}$ so obtained can be directly processed further by digital circuitry into a temperature signal $S_T$. The digital circuitry 257 preferably comprises a digital frequency or pulse width measurement circuit and a lookup table for determining a value for the temperature signal $S_T$ as a function of the measured value of the frequency or pulse width. Digital measurement of a frequency or pulse width is relatively simple.

FIG. 6C shows an alternative embodiment of the oscillator circuit 256. The embodiment shown therein differs from the one of FIG. 6, in that the first input 3 of the operational amplifier is coupled via a resistive element R8, in this case having a resistive value of 50KΩ to ground GND, instead of to a central node of a voltage divider. Also the resistance sensor 250 that measures the cell gap resistance CGR is coupled to ground GND, here via a resistor R12 having a resistive value of 50KΩ, instead of to a central node of a voltage divider. For the circuit of FIG. 6 a single supply voltage suffices. The circuit of FIG. 6C is simpler, but needs a set of 2 symmetric supply voltages.

FIG. 7 shows an example how various parts of the display unit may be geometrically arranged. FIG. 7A shows a detail VIIA of FIG. 7.

The embodiment shown in FIG. 7 has separate column drivers 10a, 10b for driving a first half 11a and a second half 11b of the column electrodes 11 and a row driver 16 for driving the row electrodes 17. The row driver 16 and the column drivers 10a, 10b are controlled by processor 150. Integrated within the processor 150 is circuitry 25 for determining the temperature signal ST from a value measured for the cell gap resistance CGR. In FIG. 7A it can be seen that the display 1 has a central area 1a for display purposes and a border area 1b for measurement purposes. The border area 1b comprises a first and a second sensor electrode. One thereof, here electrode is separate from the pixel electrodes. The other sensor electrode may also be separate, but that is not necessary. The border 1b may also be used to visually frame the central area 1a of the display with a controllable gray-value or color.

In the claims the word "comprising" does not exclude other elements or steps, and the indefinite article "a" or "an" does not exclude a plurality. A single component or other unit may fulfill the functions of several items recited in the claims. The mere fact that certain measures are recited in mutually different claims does not indicate that a combination of these measures cannot be used to advantage. Any reference signs in the claims should not be construed as limiting the scope.

What is claimed is:

1. An electrophoretic display unit comprising:
   an electrophoretic display panel comprising a medium, a first area and a second area, wherein the medium has embedded therein a plurality of electrophoretic display elements controlled by a first and a second pixel electrode;
   a sensor constructed to generate a signal dependent on a temperature of the electrophoretic display panel;
   a driver for driving the electrophoretic display panel;
   wherein the sensor includes a resistance sensor constructed to detect a resistance of the medium between a first and a second sensor electrode, and the driver is controllable according to the resistance detected by the resistance sensor,
   wherein a first electrode layer comprises individual electrode portions, one of said individual electrode portions is dedicated as the first sensor electrode and another of said individual electrode portions is dedicated as the first pixel electrode, and the first sensor electrode does not overlap the first pixel electrode,
   wherein the first pixel electrode is formed in the first area, the first sensor electrode is formed in the second area, and the second area is a border around the first area,
   wherein the resistance sensor is configured to detect the resistance of the medium during periodically recurring time intervals, the electrophoretic display unit configured such that outside the time intervals a control voltage is applied at the first sensor electrode and the second sensor electrode such that the border assumes a predetermined gray-value or color,
   wherein the sensor is part of a sensor unit, the sensor unit comprising:
   an oscillator circuit that includes the resistance sensor and that generates an electric signal with a frequency dependent on a resistive value of the resistance sensor.

2. The electrophoretic display unit according to claim 1, wherein the medium is arranged between the first electrode layer and a second electrode layer, wherein the display elements have the first pixel electrode in the first electrode layer and the second pixel electrode in the second electrode layer, wherein the first and the second sensor electrode are formed by the first and the second electrode layer respectively.

3. The electrophoretic display unit according to claim 2, wherein the second electrode layer comprises a common electrode that also forms the second sensor electrode of the at least one sensor.

4. The electrophoretic display unit according to claim 1, wherein the electrophoretic display panel has:
   a central display area with individual electrode portions controlled by a matrix of transistor elements, and
   one or more electrode portions in an area outside the display area to measure a resistance of the medium between said electrode portions and the opposing common electrode.

5. A method for driving an electrophoretic display panel having a medium embedded between a first and second pixel electrodes, a first area and a second area, the method comprising the steps of:
   detecting a resistance of the medium between a first and a second sensor electrode, wherein a first electrode layer comprises individual electrode portions, one of said individual electrode portions is dedicated as the first sensor electrode and another of said individual electrode portions is dedicated as the first pixel electrode, and the first sensor electrode does not overlap the first pixel electrode; and
   driving the electrophoretic display panel via the first and the second pixel electrode layer according to the detected resistance of the medium between the first and the second sensor electrode,
   wherein the first pixel electrode is formed in the first area, the first sensor electrode is formed in the second area, and the second area is a border around the first area,
   wherein the resistance of the medium is detected during periodically recurring time intervals, and outside the time intervals a control voltage is applied at the first sensor electrode and the second sensor electrode such that the border assumes a predetermined gray-value or color,
   wherein a sensor is utilized to generate a signal dependent on a temperature of the electrophoretic display panel and to detect the resistance of the medium and is part of a sensor unit, the sensor unit comprising:
   an oscillator circuit that includes a resistance sensor and that generates an electric signal with a frequency dependent on a resistive value of the resistance sensor.

* * * * *